(12) United States Patent
Hou et al.

(10) Patent No.: US 6,828,281 B1
(45) Date of Patent: Dec. 7, 2004

(54) SURFACTANT BLENDS FOR AQUEOUS SOLUTIONS USEFUL FOR IMPROVING OIL RECOVERY

(75) Inventors: Wangqi Hou, Dublin, OH (US); Dave Feuerbacher, Westerville, OH (US)

(73) Assignee: Akzo Nobel Surface Chemistry LLC, Chicago, IL (US)

( * ) Notice: Subject to any disclaimer, the term of this patent is extended or adjusted under 35 U.S.C. 154(b) by 88 days.

(21) Appl. No.: 09/595,996

(22) Filed: Jun. 16, 2000

(51) Int. Cl.$^7$ .......................... C09K 7/02; C09K 3/00
(52) U.S. Cl. .................. 507/227; 507/259; 507/122; 516/58
(58) Field of Search ................ 507/227, 259, 507/122; 516/58

(56) References Cited

U.S. PATENT DOCUMENTS

| | | | |
|---|---|---|---|
| 3,506,071 A | 4/1970 | Jones et al. | |
| 3,637,017 A | 1/1972 | Gale et al. | |
| 3,811,504 A | 5/1974 | Flournoy et al. | |
| 3,811,505 A | 5/1974 | Flournoy et al. | |
| 3,811,507 A | 5/1974 | Flournoy et al. | |
| 3,939,911 A | 2/1976 | Maddox, Jr. et al. | |
| 3,954,627 A | 5/1976 | Dreher et al. | |
| 3,997,451 A | 12/1976 | Plummer et al. | |
| 4,042,030 A | 8/1977 | Savins et al. | |
| 4,110,229 A | 8/1978 | Carlin et al. | |
| 4,110,232 A | 8/1978 | Schwab et al. | |
| 4,124,073 A | 11/1978 | Wier | |
| 4,125,158 A | 11/1978 | Waite et al. | |
| 4,138,345 A | 2/1979 | Williams | |
| 4,177,207 A | 12/1979 | Nussbaum et al. | |
| 4,183,406 A | * 1/1980 | Lundberg et al. | 166/295 |
| 4,193,452 A | 3/1980 | Wilson et al. | |
| 4,194,565 A | 3/1980 | Kalfoglou | |
| 4,214,999 A | 7/1980 | Carlin et al. | |
| 4,232,737 A | 11/1980 | Tyler et al. | |
| 4,245,700 A | 1/1981 | Carter et al. | |
| 4,252,192 A | 2/1981 | Nussbaum et al. | |
| 4,265,308 A | 5/1981 | Hedges et al. | |
| 4,288,334 A | 9/1981 | McCoy et al. | |
| 4,293,428 A | 10/1981 | Gale et al. | |
| 4,371,444 A | 2/1983 | McCoy et al. | |
| 4,393,937 A | 7/1983 | Dilgren et al. | |
| 4,425,455 A | 1/1984 | Turner et al. | |
| 4,425,461 A | 1/1984 | Turner et al. | |
| 4,427,812 A | * 1/1984 | Peiffer et al. | 524/115 |
| 4,448,697 A | 5/1984 | McCoy et al. | |
| 4,458,048 A | 7/1984 | Schmitt | |
| 4,458,052 A | 7/1984 | Schmitt | |
| 4,465,801 A | * 8/1984 | Peiffer et al. | 524/389 |
| 4,488,976 A | 12/1984 | Dilgren et al. | |
| 4,510,998 A | * 4/1985 | Peiffer et al. | 166/295 |
| 4,525,522 A | 6/1985 | Turner et al. | |
| 4,529,522 A | 7/1985 | Schmitt | |
| 4,562,727 A | 1/1986 | Dilgren et al. | |
| 4,579,669 A | 4/1986 | Walker et al. | |
| 4,579,671 A | 4/1986 | Lundberg et al. | |
| 4,615,393 A | * 10/1986 | Sedillo et al. | 166/308 |
| 5,100,952 A | 3/1992 | Hoskin et al. | |
| H1077 H | * 7/1992 | Peiffer et al. | 524/127 |
| 5,360,787 A | 11/1994 | Bloys et al. | |
| 5,911,276 A | 6/1999 | Kieke | |

FOREIGN PATENT DOCUMENTS

| | | |
|---|---|---|
| EP | 0 259 111 B1 | 10/1991 |
| WO | WO/99/36376 | 7/1999 |

OTHER PUBLICATIONS

A Low—Tension Waterflooding Process, W.R. Foster, Journal of Petroleum Technology, vol. 25, pp. 205–210, (Feb. 1973).

Enhanced Oil Recovery Using Lignosulphonate/Petroleum Sulphonate Mixtures, C. Chiwetelu, et al., Institution of Chemical Engineers, vol. 60, 1982.

Enhanced Oil Recovery by Displacement with Saline Solutions, Gulf Publishing Company Book Division, pp. 34–53 (1980).

Aqueous Surfactant Systems for Oil Recovery, Journal of Petroleum Technology, Feb., 1973.

The Low–Tension Polymer Flood Approach to Cost–Effective Chemical EOR, SPE, DOE, 20220, (1990).

Surfactant–Enhanced Alkaline Flooding at Intermediate pH, Department of Chemical Engineering, Illinois Institute of Technology, Chicago, IL, 60616, No. 280, vol. 87, no date.

* cited by examiner

Primary Examiner—Philip C. Tucker
(74) Attorney, Agent, or Firm—Ralph J. Mancini

(57) ABSTRACT

The present invention relates to an aqueous fluid useful for the recovery of a liquid hydrocarbon from subterranean reservoirs comprising an aqueous media and a surfactant blend. The aqueous fluid has an alkaline pH. The surfactant blend comprises at least one synthetic polyisobutylene surfactant and at least one secondary surfactant selected from the group consisting of sulfonate surfactants, alcohols and nonionic surfactants. The surfactant blend lowers the interfacial tension between hydrocarbon oil and the aqueous fluid.

17 Claims, No Drawings

SURFACTANT BLENDS FOR AQUEOUS SOLUTIONS USEFUL FOR IMPROVING OIL RECOVERY

FIELD OF THE INVENTION

The present invention involves surfactant flooding for the recovery of hydrocarbon oils in which synthetic polyisobutylene sulfonates are employed in an alkaline aqueous media in conjunction with at least one other surfactant or co-surfactants, preferably a sulfonate, an alcohols or a nonionic surfactant, or some mixture thereof, to lower the interfacial tension between the surfactant solution and the hydrocarbon oil, i.e. crude oil, that is to be recovered from a subterranean reservoir. The aqueous surfactant solutions thus allow for enhanced recovery of crude oil from subterranean reservoirs.

BACKGROUND OF THE INVENTION

Crude oil, i.e. hydrocarbons, which accumulate in and are produced from subterranean reservoirs, are recovered or produced through one or more wells drilled into the reservoir. Prior to producing the crude oil, the formation, a porous media, is saturated with crude oil and all the pores are filled with crude oil. The initial recovery of the hydrocarbons is generally accomplished by "primary recovery" techniques wherein only the natural forces present in the reservoir are utilized to produce the oil. In this primary recovery, only a portion of the crude oil is driven out of the pores by formation pressure. For instance, a usual condition upon depletion of the natural forces and the termination of primary recovery is that a rather large portion of the crude oil, typically more than half its original volume, remains trapped within the reservoir. Moreover, many reservoirs lack sufficient natural forces even to produce the oil by primary methods.

This phenomenon has long been known in the petroleum industry, and consequently, recognition of such a fact has led to the development and use of many enhanced oil recovery techniques. Most of these techniques involve injection of at least one fluid or gas into the subterranean reservoir to produce an additional amount of crude oil. These liquids include water, steam, a miscible gas such as $CO_2$ or natural gas, or an immiscible gas such as nitrogen.

While other fluids can provide higher oil recovery, water is the most widely used and economical fluid of choice. Water flooding involves the injection of water into an oil-bearing reservoir. As the water moves through the reservoir, it acts to displace the oil therein to a production system composed of one or more wells through which the oil is recovered. Nevertheless water does not displace oil with high efficiency because of the immiscibility of water and oil and because of the high interfacial tension between them.

It has long been recognized that this high interfacial tension existing between the injected water and the reservoir oil, the relative mobilities of the reservoir oil and injected water, and the wettability characteristics of the rock surfaces within the reservoir are factors which can negatively influence the amount of oil recovered by water flooding.

There are two principal mechanisms of enhancing the oil recovery of an injected fluid. These methods are increasing volumetric sweep efficiency of the injected fluid and increasing the oil displacement efficiency by the injected fluid. Both techniques involve the addition of chemicals which modify the properties of the injected fluid.

A very usefull technique for increasing the oil recovery of water has been to add surfactants to the flood water in order to effectively lower the oil/water interfacial tension and/or alter the wettability characteristics of the reservoir rock. This effective reduction in interfacial tension allows the deformation of crude oil droplets thereby improving the movement of the oil through the porous channels of the reservoir. Therefore, with the addition of the surfactants to the flood water, the interfacial tension is effectively reduced between the water and the reservoir oil, the oil droplets deform, coalesce and subsequently flow with the flood water toward the producing wells. It is generally accepted that the interfacial tension between the surfactant solution and the reservoir oil should be reduced to less than 0.1 dyne/cm for low-tension flooding to give effective recovery. In order to provide oil recovery that is effective and economically feasible, the goal is to reduce interfacial tension to $10^{-3}$ dynes/cm.

Generally, these methods of surfactant flooding which employ the injection of flood water to which has been added one or more surface active agents or surfactants, into a reservoir and allowing the solution or emulsion of surfactants to sweep through the formation and displace or recover oil, are commonly referred to as surfactant water flooding or as low tension water flooding, the latter term having reference to the mechanism involving the reduction of the oil-water interfacial tension. This procedure may be followed by a polymer solution for mobility control and improved sweep efficiency.

Anionic surfactants are popularly utilized in such water flooding applications. For example, a paper by W. R. Foster entitled "A Low-Tension Water flooding Process", *Journal of Petroleum Technology*, Vol. 25, February 1973, pp. 205-210, describes a technique involving the injection of an aqueous solution of petroleum sulfonates within designated equivalent weight ranges and under controlled conditions of salinity.

One problem encountered in water-flooding with anionic surfactants, and with petroleum sulfonates in particular, is that they tend to become depleted from the injected solution through precipitation as the solution moves through the reservoir. The surfactants tend to be lost as insoluble salts of ionic materials, such as polyvalent metal ions. This phenomenon, referred to as a lack of stability, is more often seen in so-called "hard water" or "high brine" environments. High brine waters typically contain high concentrations of inorganic salts, generally over 2% NaCl, for instance, and over 0.5% $CaCl_2$ and $MgCl_2$ total. Indeed, some "high brine" reservoirs may have concentrations of NaCl of over 4%, and concentrations of over 2% $CaCl_2$ and $MgCl_2$ combined. In particular, these surfactants tend to precipitate from solution in the presence of monovalent salts such as sodium chloride at relatively low concentrations in excess of about 2 to 3 weight percent, or in the presence of even lower concentrations of divalent metal ions such as calcium and magnesium ions. For example, divalent metal ion concentrations of about 50-100 ppm and above usually tend to cause precipitation of the petroleum sulfonates. Other depletion may be caused by the adsorption of the surface active agent on the rock surface of the reservoir, or by the physical entrapment of the petroleum sulfonates in the pore spaces of the rock matrix.

In any case, it is quite obvious that if the surface active agent is removed from the water flood solution as it moves through the reservoir, the agent is not available to decrease the interfacial tension at the oil/water interface, and quite naturally it would follow that the surfactant depletion reduces oil recovery efficiency.

In a surfactant flood oil recovery process where the water contains a surfactant, the efficiency of the oil recovery from the reservoir is strongly affected by (1) the rate of surfactant loss, or surfactant stability, and (2) the surface activity of the surfactant, or in other words, the extent to which the interfacial tension is lowered at the oil/water interface. The lower the interfacial tension, the more efficient the recovery.

The tendency of surfactantants, and in particular of petroleum sulfonates to be depleted from the injected solution, also referred to as a lack of stability, has long been recognized in the art as a problem. Many suggestions have been proposed to overcome such problems. For instance, U.S. Pat. No. 3,637,017, Gale et al. describes a process which employs sodium petroleum sulfonate surfactants having average molecular weights within the range of 465-480 and alcohols, including aliphatic alcohols from 1 to 8 carbon atoms. In the method described in Gale et al., an aqueous solution of a petroleum sulfonate is injected into the formation and the surfactant is then displaced with water containing minor quantities of alcohol. Minor quantities of alcohol may be found in the surfactant solution as well as in the displacing water.

U.S. Pat. No. 3,997,451, Plummer et al., describes a combination of two different petroleum sulfonates having an average equivalent weight within the range of about 390-450, and having an aliphatic to aromatic proton (A/AP) ratio within the range of 4-20 moles per mole but having a difference in their respective A/AP ratio of at least 2.5 moles per mole for recovering increased amounts of oil.

U.S. Pat. No. 4,042,030, Savins et al., describes water thickened by the addition of an alkyl aryl sulfonate surfactant having a molecular weight from 350-500 and a $C_4$-$C_6$ aliphatic alcohol having a hydrocarbon chain link of at least 3 carbon atoms for use in a water flooding oil recovery process. The method of oil displacement in Savins et al. is not a microemulsion flooding in which the microemulsion acts to displace oil by means of a miscible displacement process, and has different composition requirements than a microemulsion system. See col. 11, lines 25 to 37. Microemulsion systems utilize higher concentrations of surfactants and as such must address precipitation issues differently.

The use of certain combinations of anionic and nonionic surfactants to combat hard water formations has also been suggested. For example, U.S. Pat. No. 3,811,505 discloses the use of alkyl or alkylaryl sulfonates or phosphates and polyethoxylated alkyl phenols. U.S. Pat. No. 3,811,504 discloses the use of three component mixture including an alkyl or alkylaryl sulfonate, an alkyl polyethoxy sulfate and a polyethoxylated alkyl phenol. U.S. Pat. No. 3,811,507 discloses the use of a water soluble salt of a linear alkyl or alkylaryl sulfonate and a polyethoxylated alkyl sulfate.

U.S. Pat. No. 4,110,229, Carlin et al., describes an aqueous, saline surfactant-containing fluid and an oil recovery process using the fluid for recovering oil from formations containing high salinity and/or high hardness water. The fluid comprises an anionic surfactant such as organic sulfonate especially petroleum sulfonates as well as synthetic alkyl or alkylaryl sulfonate and a solubilizing co-surfactant such as an ethoxylated alcohol, alkyl phenol, or alkyl or alkylaryl thiol, or sulfated or sulfonated, ethoxylated alcohols or alkyl phenols. Carlin et al. describe that optimum performance is achieved if the ratio of primary anionic surfactant to solubilizing co-surfactant is carefully chosen to exhibit borderline solubility in the particular formation brine in which the surfactants will be employed.

The use of certain amphoteric surfactants which function as cationics in acid media and become anionic when incorporated in alkaline systems has been suggested. For example, U.S. Pat. No. 3,939,911 discloses a surfactant water flooding process employing a three-component surfactant system. This surfactant system includes an alkyl or alkylaryl sulfonate such as an ammonium dodecyl benzene sulfonate, a phosphate ester sulfonate, and a sulfonated betaine such as a $C_{12}$–$C_{24}$ alkylamido $C_1$–$C_5$ alkane dimethylanuonium propane sulfonate.

In addition to the stability issues raised with the use of petroleum sulfonates, the supply of these natural sulfonates is limited. Oil recovery processes utilize billions of pounds per year. It is recognized in the art that there remains a need for surfactants that effectively reduce interfacial tension between the flood water used in the oil recovery process and the crude oil, exhibit improved oil recovery and improved solution stability, and yet remain economical and available to use.

Surprisingly, the surfactant system of the present invention, comprising a at least one synthetic polyisobutylene sulfonate, and a secondary surfactant which preferably is a sulfonate, an alcohol, and/or a nonionic surfactant result in surfactant solutions that when used in oil recovery processes, produce ultra-low interfacial tension at the water/oil interface, and have excellent solution stability of greater than 24 hours without precipitation, so as not to deplete from the surfactant solution during the oil recovery process.

SUMMARY OF THE INVENTION

The present invention relates to an aqueous fluid useful for the recovery of a liquid hydrocarbon from subterranean reservoirs comprising an aqueous media, and a surfactant blend. The surfactant blend comprises at least one synthetic polyisobutylene sulfonate. The secondary surfactant is preferably a sulfonate, an alcohol, a nonionic surfactant, or some combination thereof. The aqueous fluid has an alkaline pH of greater than 7.

The surfactant system of the present invention, when added to a waterflood is capable of reducing interfacial tension between a liquid hydrocarbon, i.e. crude oil, and the now formed surfactant waterflood to an ultra-low value.

The interfacial tension between the alkali/surfactant waterflood and the hydrocarbon oil such as crude oil, may be about 0.001 dynes/cm at the water/oil interface or lower. The stability of the resultant surfactant solution is 24 hours or greater without precipitation.

The present invention further relates to a method of recovering oil from a subterranean reservoir penetrated by a well bore by providing an aqueous fluid into the reservoir and contacting oil with the aqueous fluid. The aqueous fluid comprises at least one polyisobutylene sulfonate surfactant and a secondary surfactant. The secondary surfactant is preferably a sulfonate, an alcohol, a nonionic surfactant, or a mixture thereof. The interfacial tension between the aqueous fluid and the oil is effectively lowered for efficient oil recovery. The aqueous fluid has an alkaline pH, and a polymeric thickener may be optionally added to the aqueous fluid for more efficient recovery.

DETAILED DESCRIPTIONS OF THE PREFERRED EMBODIMENTS

The present invention relates to novel aqueous surfactant solutions useful in oil recovery processes which involve the injection of aqueous surfactant solutions into oil bearing formations, a process commonly referred to as surfactant waterflooding or as low tension waterflooding, the latter term having reference to the mechanism involving the reduction of the oil-water interfacial tension.

The present invention in particular resides in enhanced petroleum recovery using a surfactant solution comprising a blend of surfactants including a synthetic polyisobutylene sulfonate, and a co-surfactant that is preferably another sulfonate, an alcohol, a nonionic surfactant or mixture thereof, and even more preferably is an alkyl aromatic sulfonate, in a surfactant flood. The surfactant solution is injected into an oil-bearing reservoir through one or more injection wells in order to drive the oil to the production wells. The surfactant flood is provided at an alkaline pH of greater than 7. The blend is optionally combined with a polymeric thickener.

The aqueous surfactant solutions form what are sometimes referred to in the industry as micellar or microemulsion slugs of the type disclosed in Hedges et al U.S. Pat. No. 4,265,308 (May 5, 1981) the disclosure of which is hereby incorporated by reference. The surfactant system, a blend comprising at least one polyisobutylene sulfonate, is injected into a reservoir to form the microemulsion in situ. Microemulsions are defined as those emulsions having an average particle size of about 2 $\mu$m or less.

The surfactant system of the present invention comprises at least one synthetic polyisobutylene sulfonate. The polyisobutylene sulfonates useful herein are anionic surfactants, and they are synthetic, as opposed to natural petroleum sulfonates. They are prepared by sulfonating polyisobutylene that has terminal unsaturation, or internal double bonds. Sulfonation techniques are known to one of skill in the art.

The resultant polyisobutylene sulfonates of the present invention preferably have an average equivalent molecular weight in the range of about 200 to 900 g/mole, more preferably about 250 to 600 g/mole, and most preferably about 300 to about 450 g/mole. The polyisobutylene sulfonate is preferably utilized at a concentration of about 1% to about 50%, and preferably from about 10% to about 40% by weight of the total surfactant blend, and most preferably from about 20% to about 40%.

Preferably, the cosurfactant is also an organic sulfonate, an alcohol, or a nonionic surfactant. The sulfonates are preferably aromatic sulfonates and include alkyl-benzene sulfonates with an alkyl chain length of about $C_9$–$C_{50}$, preferably from about $C_{12}$–$C_{40}$. An example of a useful alkyl benzene sulfonate is dodecyl benzene sulfonate. The alkyl chain may be saturated or unsaturated, and linear or branched. If the cosurfactant is an alkyl-benzene sulfonate, preferably the concentration will range from about 0% to about 30%, and preferably from about 5% to about 30% by weight of the total surfactant blend.

In a preferred embodiment of the present invention, alkyl-benzene sulfonates are utilized as cosurfactants. These surfactants are prepared in situ through the neutralization of sulfonic acids. Witco 1298 H and Witco HLB, for instance are alkyl benzene sulfonic acids that are made by reacting alkyl benzenes and sulfonate. These are supplied as acids, and are neutralized through the addition of an alkaline material, usually caustic sodium hydroxide, to the surfactant blend, thereby producing the resultant alkyl-benzene sulfonate surfactants. Other alkaline materials may be utilized as well. The pH of the resultant solution is preferably about 10–13.

If the cosurfactant is an alcohol, preferably it is an aliphatic alcohol. The alcohol cosurfactants may be any water soluble alcohol, and are preferably aliphatic, and include those having from about 2 to about 20 carbon atoms, and preferably from about 3 to about 12 carbon atoms, including butanol, propanol, isopropanol, amyl alcohols and hexyl alcohols including n-pentanol and n-hexanol, 2ethyl hexanol, methanol, isobutyl alcohol, n-butyl alcohol, and so on and so forth. Most preferably, the alcohol cosurfactants arc isopropanol, n-hexanol and 2-ethyl hexanol. If the cosurfactant is an alcohol, preferably the concentration will range from about 0% to about 30%, and preferably from about 2% to about 20% by weight of the total surfactant blend.

Alpha-olefin sulfonates may be optionally added to the surfactant blend. These sulfonates are useful from about 0% to about 15% by weight of the total surfactant blend.

Other surfactants or co-surfactants may optionally be added to the surfactant system of the present invention including alkyl sulfonates, amines, aldehydes, ketones, hydroxy-containing compounds, esters, ethers, or similar compounds containing one or more of hydroxy, oxy, amide, halide, and so forth. Some specific non-ionic surfactants include polyethoxylated alkyl phenols including ethoxylated nonyl phenol, polyethoxylated aliphatic alcohols, carboxylic esters, carboxylic amides, and polyoxyethylene fatty acid amides, and so forth. These optional surfactants or co-surfactants may be added at a concentration up to about 20% by weight of the total surfactant blend. This list is intended for illustrative purposes only, and is no way intended as an exclusive list of possible surfactants or co-surfactants which may be added to the solutions of the present invention.

These surfactants or co-surfactants used in combination with the polyisobutylene sulfonate surfactants of the present invention have been found to provide very low interfacial tension in a very cost effective manner. The surfactants are added to lower the interfacial tension between the aqueous phase and the hydrocarbon or oil phase. It is desirable to have interfacial tension (IFT) values of about $1 \times 10^{-3}$ dynes/cm to about 0.10 dynes/cm, and preferably from about $1 \times 10^{-4}$ to about 0.05 dynes/cm.

As stated above, the surfactants of the present invention are supplied in an alkali solution. The alkali solution is generally formed by adding a basic or alkaline material such as caustic to the surfactant system. As stated above, these alkaline materials are added to the surfactant solution to neutralize the acids thereby forming salts. Some surfactants are in acid form. The final pH of the surfactant solution will be about 10–13. In this pH range, the resultant solution is easier to handle, transport and store. The alkaline material is added to the surfactant solution at a concentration of about 1% to about 20% by weight of the solution, preferably about 5% to about 15% by weight of the solution.

These surfactant systems may be utilized in oil recovery processes. In oil recovery processes, the surfactant system is added to a waterflood that is injected into an oil-bearing formation in order to improve the amount of oil recovered from the reservoir.

The surfactant or surfactant blend is added to the waterflood at a concentration of about 0.01 wt-% to about 2 wt-%. A concentration of greater than about 2 wt-% is not economically efficient. The ratio of surfactants in the surfactant blend is as described above. The blends of surfactants may be adjusted so as to accommodate the specific conditions of a reservoir, i.e. temperature, water type such as "hard water" situations, and so forth.

It is preferable to the present invention that the waterflood be basic or slightly basic having a pH of greater than 7. It is therefore desirable to add an alkaline material to the surfactant waterflood. The alkaline material may be an alkali metal or an alkaline earth metal hydroxide, or a metal salt. These alkaline material facilitates increased oil recovery by further reducing interfacial tension. The alkaline material may react with organic acids naturally present in the crude oil, thereby forming surfactants in situ.

The alkaline material is preferably added at a concentration of about 0.1 wt-% to about 2 wt-%, more preferably about 0.1 to 1%, and most preferably from about 0.1 wt-% to about 0.75 wt-%. Increasing the alkaline material more can lead to precipitation of the surfactants from solution. Using a combination of surfactant(s) and alkaline material in the waterflood for oil recovery may be referred to as a surfactant flooding, alkaline flooding, or as alkali/surfactant flooding.

It is preferable that the solution stability of the surfactant in the surfactant flood be greater than 24 hours without precipitation. As stated above, increasing the alkalinity of the surfactant flood, may decrease the solution stability, and consequently, this must be considered upon the addition of such materials.

Optionally, viscosifiers, such as polymeric thickening agents, may be added to all or part of the injected water in order to increase the viscosity thereof, thus decreasing the mobility ratio between the injected water and oil and improving the sweep efficiency of the water flood. Such compounds are also sometimes referred to as mobility-reducing agents. Polysaccharide polymers may be utilized to increase the viscosity of the solution. Preferably, the polymers are water soluble, and will not adsorb onto the reservoir rocks. Other mobility-reducing agents include polyacrylamides, copolymers of acrylamides and acrylic acid or sodium acrylate, N-sulfohydrocarbon-substituted acrylamides, and so forth. Such polymers are sold by a variety of companies including Dow Chemical Co. in Midland, Mich. The polymer is preferably added to the waterflood at a concentration of about 0.001% to about 1% by weight of the total solution.

A specific preferred polymeric thickener is Alcoflood® 1235, a water soluble polymeric viscosifier available from Ciba Specialty Chemicals in Tarrytown, N.Y. If a viscosifying polymer is added to the waterflood, this may be referred to as an alkali/surfactant/polymer flooding or surfactant/polymer flooding.

A clay stabilization or sand stabilization material may also be optionally added to the surfactant solutions of the present invention. During oil recovery processes, sands and other materials may become entrained in the recovered oil. This is prevented by the addition of a clay stabilization or sand stabilization material. Epoxy resins are often used for this process. Also used in this process are polyfunctional cationic polymers, such as poly(N-acrylamidomethyltnrnethyl ammonium chloride) or poly(vinylbenzyltrimethyl ammonium chloride).

Other optional ingredients that may be added to the waterflood include, but are not limited to, other cosurfactants, corrosion inhibitors, oxygen scavengers, bactericides, and so forth, and any combination thereof.

The alkalilsurfactant or alkali/surfactant polymer combinations may be utilized in both secondary and tertiary oil recovery processes, although the use of such solutions in other applications is also not excluded. The solutions are injected into the oil-bearing formation. The surfactant solution may contain both surfactants and polymeric thickener, or may contain only surfactants with no polymeric thickener (keeping in mind that other optional ingredients mentioned above may also be present). The use of such solutions in oil recovery processes in which flooding is used may be referred to as micellar flooding, surfactant flooding, or if a viscosifying polymer is also included in the surfactant system, polymer-surfactant flooding. These are terms of art and are thus known to one of skill in the art.

The addition of the surfactant system to the waterflood results in a significant decrease in interfacial tension between the crude oil and the waterflood, improving the efficiency of the waterflood in displacing crude oil to the production well. Basically, an emulsion is formed between the waterflood and the crude oil, thus allowing water to displace or carry crude oil from the reservoir to the production well. Also, upon injection, the reservoir becomes repressurized and a natural driving force is restored further stimulating oil production.

In some preferred embodiments of the present invention, the polyisobutylene sulfonate surfactant is utilized in combination with alkylbenzene sulfonic acids, and alcohols. Other surfactants such as nonyl phenol ethoxylate and alpha-olefin sulfonate were also added to the surfactant solution. Caustic (50%) is utilized to neutralize the sulfonic acids and to raise the pH of the resultant solution. Using these particular surfactant blends, it is preferable that the concentration of NaOH in the waterflood not exceed about 0.75% by weight of the flood water. At concentrations much higher than about 0.75% NaOH, precipitation of surfactant (s) was observed.

For some embodiments, the concentration of NaOH could be as high as 2.0 wt-% in the final flood water with no precipitation of the surfactant(s) being observed. The concentration of NaOH must therefore be adjusted on a solution by solution basis. In any event, whether an alkaline material is added to the flood water or not, it is preferable that the resultant solution have a solution stability of greater than 24 hours without precipitate.

It is preferable to the present invention that the surfactant system, and therefore the surfactant waterflood, contain alkaline material, polymer and surfactant all in one. This increases the efficiency of the oil recovery process.

Optionally, a preflush may be utilized prior to injection of the surfactant waterflood. The preflush may consist of a hydrocarbon fluid, a brine solution, or simply water.

Also, the surfactant waterflood may optionally be followed by an injection of the reservoir with a mobility control fluid or polymeric flush, which is generally a polymer-thickened aqueous solution, into the formation. The same polymeric thickeners utilized in the alkali/surfactant/polymer flood of the present invention, may be utilized in this flush. These polymers include biopolysaccharides, cellulose ethers, acrylamide-derived polymers, or mixtures thereof This further improves oil recovery. The polymeric solution is utilized to drive or push the now oil bearing surfactant flood out of the reservoir, thereby "sweeping" crude oil out of the reservoir. Further, the polymeric solution has a very high viscosity which helps to prevent what is referred to in the industry as channeling or "fingering", thus improving sweep efficiency.

This polymeric flush or mobility control fluid may once again be followed by a water flush which may be brine or saline or softened water, or fresh water.

Many prior art methods utilize the preflush, followed by the micellar or surfactant slug. The polymer solution is then injected behind the surfactant slug. This process has been found to result in dilution of the surfactant, reduced contact of the micellar slug with the crude oil, and trapping of some of the micellar slug in the reservoir. While the preflush and subsequent polymer solution may also be utilized with the surfactant system of the present invention, it is preferable that the recovery process of the present invention utilize only one solution for improved efficiency.

Oil is recovered at a production well spaced apart from the injection well as the drive fluid pushes the mobility buffer slug which sweeps the oil out of the pores in the formation and to the production well. Once the water/oil emulsion reaches the surface, it is put into holding tanks where it is subsequently demulsified, thereby allowing the oil to separate from the water through the natural forces of gravity.

The amount of oil recovered is measured as a function of the original oil in place (OOIC). Preferably, using the method of the present invention, the amount of oil recovered is greater than about 5% by weight of the original oil in place, preferably 10% or greater by weight of the original oil in place, and more preferably 15% or greater by weight of the original oil in place.

EXAMPLES

Examples 1–4

The following surfactant solutions were prepared as shown in Table 1.

TABLE 1

| | Examples | | | |
|---|---|---|---|---|
| Ingredients | 1 | 2 | 3 | 4 |
| Witconate ® 3500 | 10.0 | 7.5 | 6.85 | 27.41 |
| Witconate ® 4500 | 30.0 | 22.2 | 20.55 | — |
| Witco HLB acid | — | 14.8 | 13.7 | 13.7 |
| Witco 1298 hard acid | 20.0 | 14.8 | 13.7 | 13.7 |
| Witconol ® NP-100 | 10.0 | 18.5 | 17.13 | 17.13 |
| 2-ethyl hexanol | — | 3.7 | 3.43 | 3.43 |
| isopropanol | 5.0 | 3.7 | 3.43 | 3.43 |
| 2-butanol | 5.0 | — | — | — |
| caustic (50% active) | 10.0 | 7.4 | 6.85 | 6.85 |
| water | 10.0 | 7.4 | 6.85 | 6.85 |
| Witconate ® AOS | 7.5 | — | 7.5 | 7.5 |

Witconate ® 3500/Witconate ® 4500 are polyisobutylene sulfonates
Witco HLB acid alkyl benzene sulfonic acid having a mixture containing alkyl chain lengths of $C_{13}$ to $C_{50}$
Witco 1298 Hard Acid dodecylbenzenesulfonic acid
Witconol ® NP-100 ethoxylated nonyl phenol (10 mole)
Witconate ® AOS Alpha-olefin sulfonate having a chain length of $C_{12}$ to $C_{16}$ Each of the above examples was added to softened fresh water at a concentration of 0.1% by weight and Alcoflood® 1235 water soluble polymeric viscosifier was added at a concentration of 650 mg/L to the mixture to simulate a polymer-surfactant waterflood.

A comparative flood water composition, A, having 0.1 wt-% of a commercially available synthetic petroleum sulfonate surfactant, and 650 mg/l of Alcoflood® 1235 was also prepared. All other ingredients were the same.

The interfacial tension (dynes/cm) between the flood water composition as described above, and the crude oil was measured at a temperature of 60° C. as a function of the alkali concentration (NaOH). The original interfacial tension between the flood water and the crude oil was found to be >21,100 dynes/cm. The stability as a function of the NaOH concentration was also observed at 60° C. The samples were rated according to precipitation (ppt), wets glass (wg), stable (s), not stable (ns), and not stable at room temperature (nsrt). The results are reported in Table 2.

TABLE 2

| NaOH Conc. | Flood water compositions | | | | |
|---|---|---|---|---|---|
| wt-% | Ex 1 | Ex 2* | Ex 3 | Ex 4 | Comp A |
| 0.00 | 3.214 (s) | 1.544 (s) | 0.679 (s) | 0.298 (s) | 0.1 (s) |
| 0.50 | 0.052 (s) | 0.315 (s) | 0.010 (s) | 0.015 (s) | 0.001 (s) |
| 0.75 | 0.033 (s) | 0.08 (s) | 0.001 (s) | 0.001 (s) | 0.001 (s) |
| 1.00 | 0.013 (s) | ppt | 0.003 (s) | <0.001 (s) | 0.001 (s) |
| 1.25 | 0.008 (s) | ppt | ppt | ppt | ppt |
| 1.50 | 0.001 (s) | ppt | ppt | ppt | ppt |
| 1.75 | 0.001 (s) | ppt | ppt | ppt | ppt |
| 2.00 | 0.001 (s) | ppt | ppt | ppt | ppt |

*Example 2 was averaged over 3 trials, using 3 different lots of surfactant blend. One of the trials exhibited precipitation at 0.50 and 0.75 wt-% NaOH as well.

Some of the examples were repeated using synthetic nanofiltered fresh water instead of the softened fresh water. The synthetic nanofilter fresh water had less sodium, potassium, sulfate, carbonate, and bicarbonate. Calcium, magnesium, barium, strontium, iron, and chloride ions are reduced, and the total dissolved solids was less. The interfacial tension (dynes/cm) of the flood water and the crude oil were measured as a function of NaOH concentration. The results are shown in Table 3.

TABLE 3

| | Interfacial Tension (dynes/cm) | |
|---|---|---|
| NaOH Conc. wt-% | Example 1 | Example 4 |
| 0.00 | 4.480 (s) | 0.758 (s) |
| 0.50 | 0.122 (s) | 0.059 (s) |
| 0.75 | 0.078 (s) | 0.006 (s) |
| 1.00 | 0.046 (s) | 0.002 (s) |
| 1.25 | 0.013 (s) | 0.003 (s) |
| 1.50 | 0.003 (s) | 0.003 (s) |
| 1.75 | 0.003 (s) | ppt |
| 2.00 | 0.001 (s) | ppt |

Example 5

A further experiment was conducted in which 0.025 wt-% Witconateg AOS, alpha olefin surfactant was utilized with 0.075 wt-% of the surfactant blend found in Example 2. This surfactant blend was dissolved in softened fresh water. The alkali concentration was then measured and the stability and the interfacial tension (dynes/cm) were measured as a function of the NaOH concentration. The solution was stable to higher concentrations of NaOH, but the interfacial tension was not reduced as much as the previous examples. The results are reported in Table 4.

TABLE 4

| NaOH Conc. wt-% | Interfacial Tension | Stability |
|---|---|---|
| 0.00 | 0.531 | stable |
| 0.50 | 0.099 | stable |
| 0.75 | 0.079 | stable |
| 1.00 | 0.080 | stable |
| 1.25 | 0.047 | stable |
| 1.50 | 0.035 | stable |
| 1.75 | 0.025 | stable |
| 2.00 | 0.025 | stable |

Examples 6–9

Radial Corefloods Procedures

Radial corefloods were performed using fresh core in radial coreholders. The core (a piece of reservoir formation) is a porous media having pores. The pore volume is the total volume of porouse channels in the core. The overburden pressure was maintained with a rubber bladder at the bottom of the coreholder. The following steps were performed.

a. The fresh core was saturated by evacuation with produced water. The pore volume and the porosity was estimated.

b. The coreholder was loaded with a 2" high by full diameter fresh core and the temperature was stabilized at 60° C.

c. Produced water was injected at three different flow rates to determine the effective permeability of the core to water.

d. Crude oil was injected at 60° C. at four rates to saturate the core with oil and determine the effective permeability to oil.

e. Fresh water was injected at 60° C. at 0.5 ft/day flow rate for approximately 2–3 pore volumes and the effective permeability of the core to water was determined. The step physically simulates the waterflood.

f. An alkaline/surfactant/polymer solution was injected for about 0.3 PV.

g. Polymer flush solution was injected for about 0.3 PV.

h. Approximately 2–3 PV of fresh water was injected into the coreflood.

i. The core was then resaturated with produced water to determine the pore volume and porosity.

Fluids were injected into the radial corefloods and the oil recovery data was measured, and in particular, the tertiary oil recovery in a coreflood resulting from injection of alkali/surfactant/polymer solutions of the present invention was measured. The alkalilsurfactant/polymer solutions are found in Table 7, along with the oil recovery data. Each of the surfactants found in Examples 1–4 was utilized in corefloods 6–9. Example 6 utilized a blend of the surfactant found in Example 2, plus Witconate® AOS alphaolefin sulfonate surfactant. Each of the corefloods had oil cuts less than 2% prior to chemical injection.

Prior to injection of the fluids, it is necessary to first determine core properties which were estimated as described in Test Method 1, above. The properties of each core, labeled according to the corresponding solutions injected into each core, are found in Table 5.

TABLE 5

| | Core Properties | | | | | |
|---|---|---|---|---|---|---|
| Core | B | C | 6 | 7 | 8 | 9 |
| Depth, m | 1318.70 | 1319.00 | 1316.40 | 1316.48 | 1316.24 | 1316.32 |
| Pore Vol (PV), mL | 60.65 | 78.80 | 74.30 | 74.21 | 72.99 | 73.33 |
| Porosity, % | 17.0 | 21.9 | 20.6 | 20.6 | 20.4 | 20.5 |
| Oil Permeability | 6.8 | 29.3 | 23.7 | 21.0 | 66.9 | 55.8 |
| Water Permeability | 0.736 | 4.64 | 2.60 | 2.43 | 10.2 | 16.0 |
| Mobility Ratio | 0.6 | 0.9 | 0.7 | 0.7 | 0.9 | 1.7 |

PV = pore volume; The core (a piece of reservoir formation) is a porous media and the pore volume is the total number of all pores within the core.

Prior to injection of each alkali/surfactant/polymer solution, a fresh water flush was conducted. Following injection of the alkali/surfactant/polymer solution, a polymer flush was injected, followed again by a fresh water flush. The volume of the respective flushes, as measured relative to the core pore volume, PV, as well as other properties of the polymer flush, are found in Table 6.

TABLE 6

| Core | B | C | 6 | 7 | 8 | 9 |
|---|---|---|---|---|---|---|
| Fresh water, PV | 1.467 | 0.927 | 2.587 | 2.618 | 2.834 | 2.714 |
| Polymer | 1235 | 1235 | 1235 | 1235 | 1235 | 1235 |
| Visc, 60 C., cPs | 2.0 | 2.9 | 3.7 | 3.7 | 3.7 | 3.7 |
| Conc (mg/L) | 650 | 750 | 650 | 650 | 650 | 650 |
| Pore Vol (PV) | 0.401 | 0.257 | 0.328 | 0.317 | 0.307 | 0.308 |
| Fresh water, PV | 2.907 | 2.365 | 2.617 | 2.641 | 2.715 | 2.699 |

Properties, injected volumes, and results of the alkali/surfactant/polymer solution are reported in Table 7.

TABLE 7

| Coreflood | Comp B | Comp C | Ex 6 | Ex 7 | Ex 8 | Ex 9 |
|---|---|---|---|---|---|---|
| Water | synthetic fresh | synthetic fresh | fresh | fresh | fresh | fresh |
| Base | NaOH | NaOH | NaOH | NaOH | NaOH | NaOH |
| wt-% | 0.5 | 1.0 | 0.75 | 0.75 | 0.75 | 0.75 |
| Surfactant | A | A | 1 | 2 + AOS | 3 | 4 |
| wt-% | 0.1 | 0.1 | 0.1 | 0.075 | 0.1 | 0.1 |
| Polymer | 1235 | 1235 | 1235 | 1235 | 1235 | 1235 |
| mg/L | 650 | 750 | 650 | 650 | 650 | 650 |
| Visc @ 60° C. (cPs) | 1.7 | 2.3 | 2.8 | 2.9 | 3.0 | 3.0 |
| Peak Tert Oil Cut, % | 8.4 | 7.5 | 8.5 | 7.8 | 7.3 | 12.3 |
| Vol. Inject. PV | 0.40 | 0.48 | 0.52 | 0.32 | 0.55 | 0.39 |
| % OOIP | 10.5 | 8.3 | 9.4 | 5.9 | 7.0 | 11.2 |

1235 = Alcoflood 1235 water soluble polymer

Example 9 exhibited superior performance, outperforming the comparative examples, B and C, both of which utilized a commercially available petroleum sulfonate surfactant, labeled surfactant A. Surfactant A is a natural petroleum sulfonate produced as a by-product of the white mineral oil refining process. Examples exhibited synthetic surfactants performance comparable to the petroleum sulfonates. Peak oil cuts for Example 9 increased from near zero to 12.3%.

Summarizing Table 7, the alkali/surfactant/polymer flood found in Example 9 outperformed all of the other corefloods including those based on commercially available nonsynthetic petroleum surfactants, both in terms of the peak oil cut and in terms of tertiary oil recovery.

What is claimed is:

1. An aqueous fluid useful for the recovery of a liquid hydrocarbon from subterranean reservoirs, said aqueous fluid having a pH of greater than 7 and comprising:
   a) an aqueous media; and
   b) a surfactant blend, said surfactant blend comprising at least one synthetic polyisobutylene sulfonate surfactant.

2. The aqueous fluid of claim 1 wherein said surfactant blend comprises at least one second surfactant selected from the group consisting of sulfonate surfactants, alcohols, nonionic surfactants, and mixtures thereof.

3. The aqueous fluid of claim 1 wherein upon contacting said aqueous fluid and said liquid hydrocarbon, the interfacial tension between said aqueous fluid and said liquid hydrocarbon is about $1 \times 10^{-3}$ dynes/cm to about 0.1 dynes/cm.

4. The aqueous fluid of claim 1 wherein upon contacting said liquid hydrocarbon with said aqueous fluid, the interfacial tension between said liquid hydrocarbon and said aqueous fluid is about $1 \times 10^{-4}$ to about 0.05 dynes/cm.

5. The aqueous fluid of claim 1 wherein said synthetic polyisobutylene sulfonate has a molecular weight from about 200 to about 900 g/mole.

6. The aqueous fluid of claim 1 wherein said synthetic polyisobutylene sulfonate has a molecular weight from about 250 to about 600 g/mole.

7. The aqueous fluid of claim 1 wherein said surfactant blend further comprises at least one alkyl-benzyl sulfonate.

8. The aqueous fluid of claim 1 wherein said surfactant blend further comprises at least one dodecyl benzene sulfonate.

9. The aqueous fluid of claim 1 wherein said fluid comprises from about 0.01 % to about 2% by weight of said surfactant blend.

10. The aqueous fluid of claim 9 wherein said surfactant blend comprises from about 10% to about 40% by weight synthetic polyisobutylene surfactant.

11. The aqueous fluid of claim 9 wherein said surfactant blend comprises from about 5% to about 30% by weight of at least one alkyl benzene sulfonate surfactant.

12. The aqueous fluid of claim 9 wherein said surfactant blend further comprises an alcohol at a concentration from about 2% to about 20% by weight of the surfactant blend.

13. The aqueous fluid of claim 1 wherein said surfactant blend further comprises at least one alcohol and at least one alkyl benzene sulfonate.

14. The aqueous fluid of claim 1 further comprising from about 0.01% to about 2% by weight of at least one alkaline material.

15. The aqueous fluid of claim 1 further comprising from about 0.1% to about 0.75% by weight of at least one alkaline material.

16. The composition of claim 1 further comprising a water soluble polymeric viscosifier.

17. The aqueous fluid of claim 1 wherein said aqueous fluid has improved stability of greater than 24 hours without precipitation.

* * * * *